United States Patent
Liu et al.

(10) Patent No.: US 11,192,283 B2
(45) Date of Patent: Dec. 7, 2021

(54) MANUFACTURING APPARATUS AND METHOD FOR MOLDED LENS

(71) Applicant: Young Optics Inc., Hsinchu (TW)

(72) Inventors: Shiue-Li Liu, Hsinchu (TW); Ming-Yuan Chou, Hsinchu (TW); Tzu-Lun Wang, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 351 days.

(21) Appl. No.: 16/446,629

(22) Filed: Jun. 20, 2019

(65) Prior Publication Data

US 2020/0189153 A1    Jun. 18, 2020

(30) Foreign Application Priority Data

Dec. 14, 2018   (TW) ................. 107145140

(51) Int. Cl.
*B29C 43/02*    (2006.01)
*B29C 43/36*    (2006.01)
*B29C 43/58*    (2006.01)
*B29L 11/00*    (2006.01)

(52) U.S. Cl.
CPC ............ *B29C 43/021* (2013.01); *B29C 43/36* (2013.01); *B29C 2043/5841* (2013.01); *B29L 2011/0016* (2013.01)

(58) Field of Classification Search
None
See application file for complete search history.

(56) References Cited

U.S. PATENT DOCUMENTS 7,350,379 B2    4/2008   Ueda et al.

FOREIGN PATENT DOCUMENTS

TW    I311793        7/2009
TW    201407306      2/2014

*Primary Examiner* — Robert J Grun
(74) *Attorney, Agent, or Firm* — JCIPRNET

(57) ABSTRACT

A manufacturing apparatus and a manufacturing method for a molded lens are provided. A substrate is located between a first molding core and a second molding core, and the first molding core is moved so that the substrate is formed into a lens. A distance sensor sends a plurality of press distance parameters of moving the first molding core, and the press distance parameters may form a press curve. The press curve and a reference press curve is compared for a difference by a processor and a comparator. The processor determines whether the difference is within an error range.

19 Claims, 7 Drawing Sheets

MANUFACTURING APPARATUS AND METHOD FOR MOLDED LENS

CROSS-REFERENCE TO RELATED APPLICATION

This application claims the priority benefit of Taiwan application serial no. 107145140, filed on Dec. 14, 2018. The entirety of the above-mentioned patent application is hereby incorporated by reference herein and made a part of this specification.

BACKGROUND OF THE INVENTION

1. Field of the Invention

The invention relates to a technique of forming an article through press molding, and particularly relates to a manufacturing apparatus and a manufacturing method for a molded lens capable of effectively monitoring quality.

2. Description of Related Art

Due to different molds, lenses, and processes in different lens manufacturing processes, a press curve only helps identify whether pressing is performed, but does not help in identifying variation in a pressing process and the actual lens press depth. As the conventional press curve only helps identify whether pressing is performed, but does not help in identifying variation in a pressing process and the actual lens press depth, the cost for subsequent quality control is thus induced.

SUMMARY OF THE INVENTION

The embodiments of the invention provide a manufacturing apparatus and a manufacturing method for a molded lens capable of identifying a lens with abnormal quality in different lens pressing processes, so as to improve the quality.

In a manufacturing method for a molded lens according to an embodiment of the invention, a substrate is located between a first molding core and a second molding core, and the first molding core is moved so that the substrate is formed into a lens. A plurality of press distance parameters of moving the first molding core are sent by a distance sensor. The press distance parameters form a press curve. The press curve and a reference press curve are compared for a difference by using a processor and a comparator. Whether the difference is within an error range is determined by the processor.

A manufacturing apparatus for a molded lens according to an embodiment of the invention performs a pressing process on a substrate. The manufacturing apparatus includes: a molding chamber, wherein a first molding core or a second molding core is movable in the molding chamber, and the substrate is located between the first molding core and the second molding core; a distance sensor, close to the molding chamber; a processor, coupled to the distance sensor; an pneumatic cylinder, coupled to the processor and capable of moving the first molding core or the second molding core; a pressure adjusting valve, coupled to the processor and the pneumatic cylinder and capable of adjusting a pressure of the pneumatic cylinder; a pressure gauge, coupled to the processor and the pneumatic cylinder and capable of displaying the pressure of the pneumatic cylinder; a heater, coupled to the processor and capable of heating the molding chamber; a power meter, coupled to the processor and the pneumatic cylinder and capable of measuring power of the heater; a temperature controller, coupled to the processor and the heater and capable of controlling a temperature of the heater; a comparator, coupled to the processor, wherein the distance sensor sends a plurality of press distance parameters of the pressing process, the press distance parameters form a press curve, and the processor and the comparator compare the press curve and a reference press curve for a difference; and a storage device, wherein data of the reference press curve is stored in a storage device.

Based on the above, the embodiments of the invention are capable of in-situ monitoring the actual press depth and the variation in the pressing process, so as to eliminate a defective article and reduce the cost for subsequent quality control.

To make the above features and advantages of the invention more comprehensible, embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
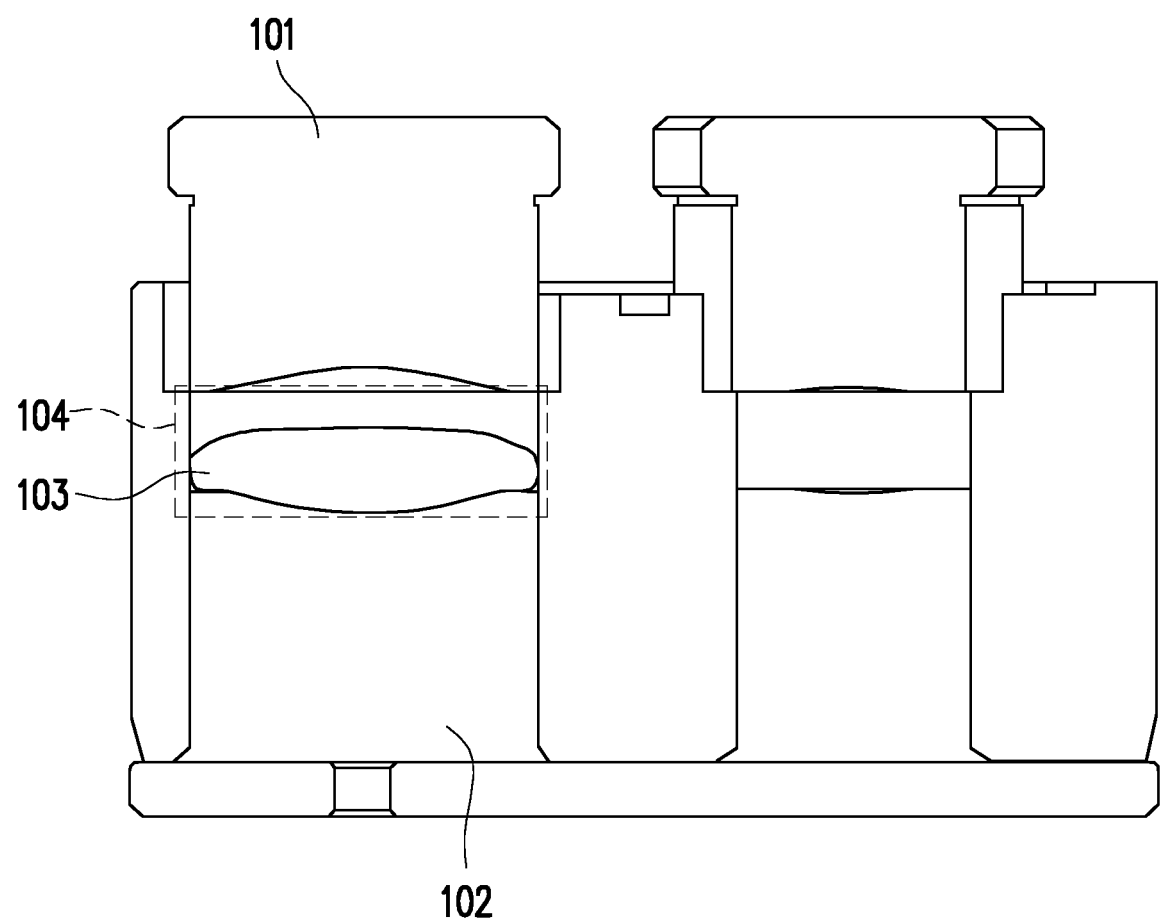
FIG. 1 is a schematic view illustrating the appearance of a manufacturing apparatus for a molded lens according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic view illustrating the appearance of a manufacturing apparatus for a molded lens according to an embodiment of the invention. Referring to FIG. 1, the manufacturing apparatus for the molded lens includes a first molding core 101 and a second molding core 102. A molding chamber 104 is formed by a space between the first molding core 101 and the second molding core 102. A substrate 103 is disposed in the molding chamber 104, so as to perform a pressing process on the substrate 103 by using the first molding core 101 and the second molding core 102. A material of the substrate 103 may include glass or a polymer material such as plastics, etc.

Figure 2:
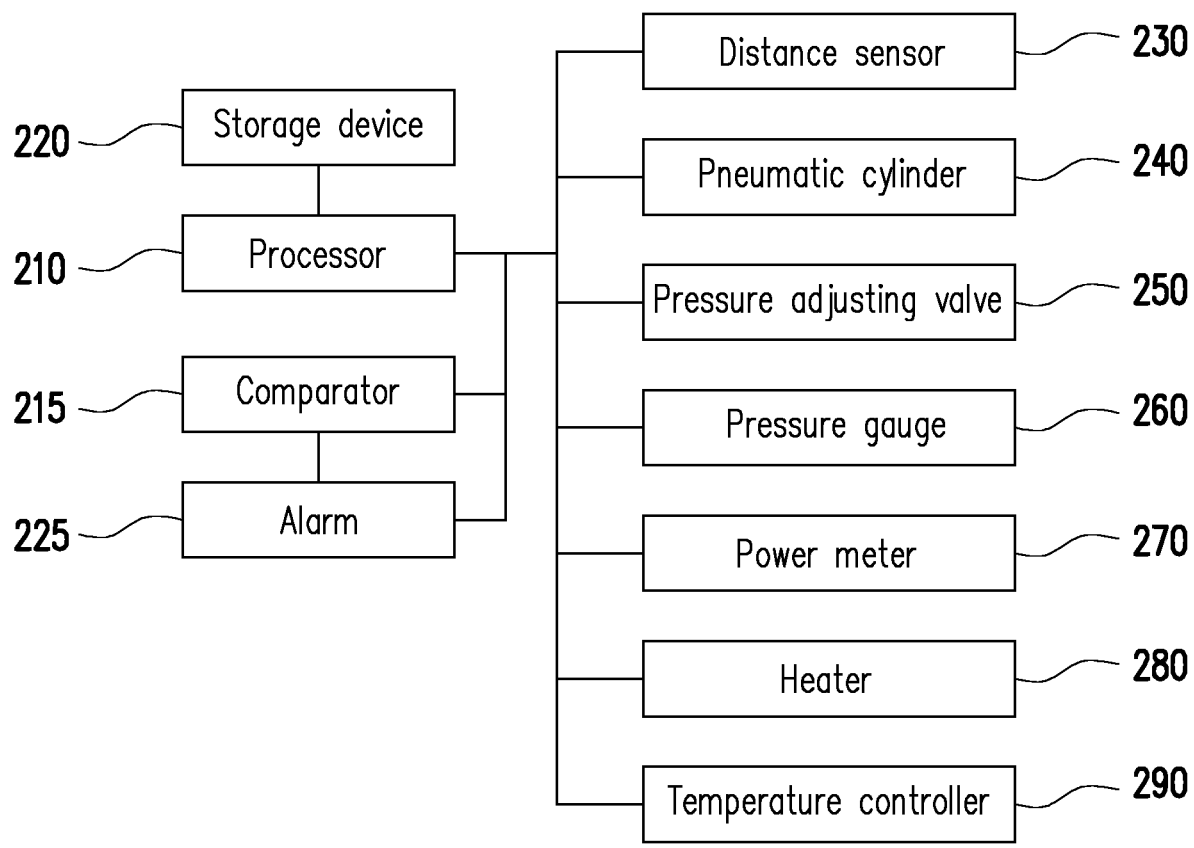
FIG. 2 is a block diagram illustrating a manufacturing apparatus for a molded lens according to an embodiment of the invention.

FIG. 2 is a block diagram illustrating a manufacturing apparatus for a molded lens according to an embodiment of the invention. Referring to FIG. 2, the manufacturing apparatus for the molded lens includes a processor 210, a comparator 215, a storage device 220, an alarm 225, a distance sensor 230, a pneumatic cylinder 240, a pressure adjusting valve 250, a pressure gauge 260, a power meter 270, a heater 280, and a temperature controller 290.

A central processing unit (CPU), a physics processing unit (PPU), a programmable microprocessor, an embedded control chip, a digital signal processor (DSP), an embedded control chip, an application specific integrated circuit (ASIC), etc., other similar devices, may serve as the CPU 210.

The comparator 215 may be realized as a voltage comparator, a current comparator, or other similar devices, etc.

The storage device 220 may be any type of static or removable random access memory (RAM), read-only memory (ROM), flash memory, secure digital memory card (SD memory card), hard drive, other similar device, or a combination thereof. The storage device 220 stores a module formed by one or more programming code segments. The processor 210 executes the module, so as to realize the manufacturing method for the molded lens.

The distance sensor 230 is close to the molding chamber 104 and coupled to the processor 210, and is configured to sense a distance between the first molding core 101 and the second molding core 102. The pneumatic cylinder 240 is coupled to the processor 210, and is configured to move the first molding core 101 or the second molding core 102 in the molding chamber 104. The pressure adjusting valve 250 is coupled to the processor 210 and the pneumatic cylinder 240, and is configured to adjust the pressure of the pneumatic cylinder 240. The pressure gauge 260 is coupled to the processor 210 and the pneumatic cylinder 240, and is configured to display the pressure of the pneumatic cylinder 240. The power meter 270 is coupled to the processor 210 and the heater 280, and is configured to measure the power of the heater 280. The heater 280 is coupled to the processor 210, and is configured to heat the molding chamber 104. The temperature controller 290 is coupled to the processor 210 and the heater 280, and is configured to control the temperature of the heater 280.

Figure 3:
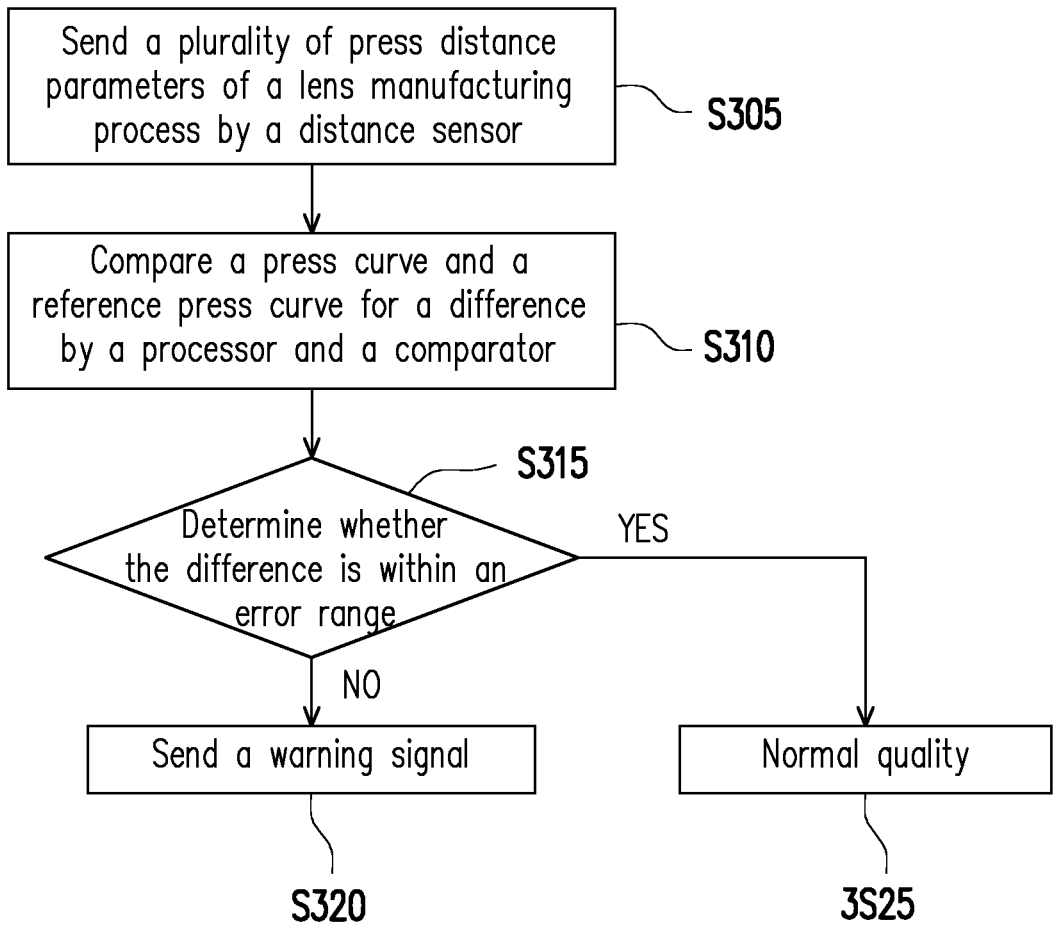
FIG. 3 is a flowchart illustrating a manufacturing method for a molded lens according to an embodiment of the invention.

FIG. 3 is a flowchart illustrating a manufacturing method for a molded lens according to an embodiment of the invention. Referring to FIGS. 1 to 3, at Step S305, the distance sensor 230 sends a plurality of press distance parameters of a lens manufacturing process, and the press distance parameters may form a press curve. Then, at Step S310, the press curve and a reference press curve is compared for a difference by the processor 210 and the comparator 215. The data of the reference press curve is stored in the storage device 220. At Step S315, whether the difference is within an error range is determined by the processor 210. If the difference is within the error range, as shown in Step S325, the quality is determined as normal. If the difference is not within the error range, as shown in Step S320, a warning signal is sent by the alarm 225. The warning signal may be, for example, an audio signal or a video signal. For example, a warning sound may be played via a speaker, or a warning message may be displayed on a display.

Here, the data of the press curve may be formed according to the following. The processor 210 receives a plurality of press parameters corresponding to the lens manufacturing process from the distance sensor 230, so as to obtain a plurality of preliminary press curves. Depending on different molding cores, different machines, or different press settings (temperature, pressure, velocity, torque), the distances for press molding may vary.

The function of the press parameter satisfies one of the following conditions:

$$F(T,P,V)=f\{T(t),P(w,a),V(t,g)\}; \quad (1)$$

wherein F represents a thickness of the substrate, T represents a temperature, P represents a pressure, V represents a velocity, t represents time, w represents an acting force, a represents an area of a thrust surface, and g represents a distance between two molding cores; and $$F(T,W)=f\{T(t),W(w,d)\}; \quad (2)$$

wherein F represents the thickness of the substrate, T represents the temperature, W represents work, t represents time, w represents the acting force, and d represents a moved distance of the molding core.

Figure 4:
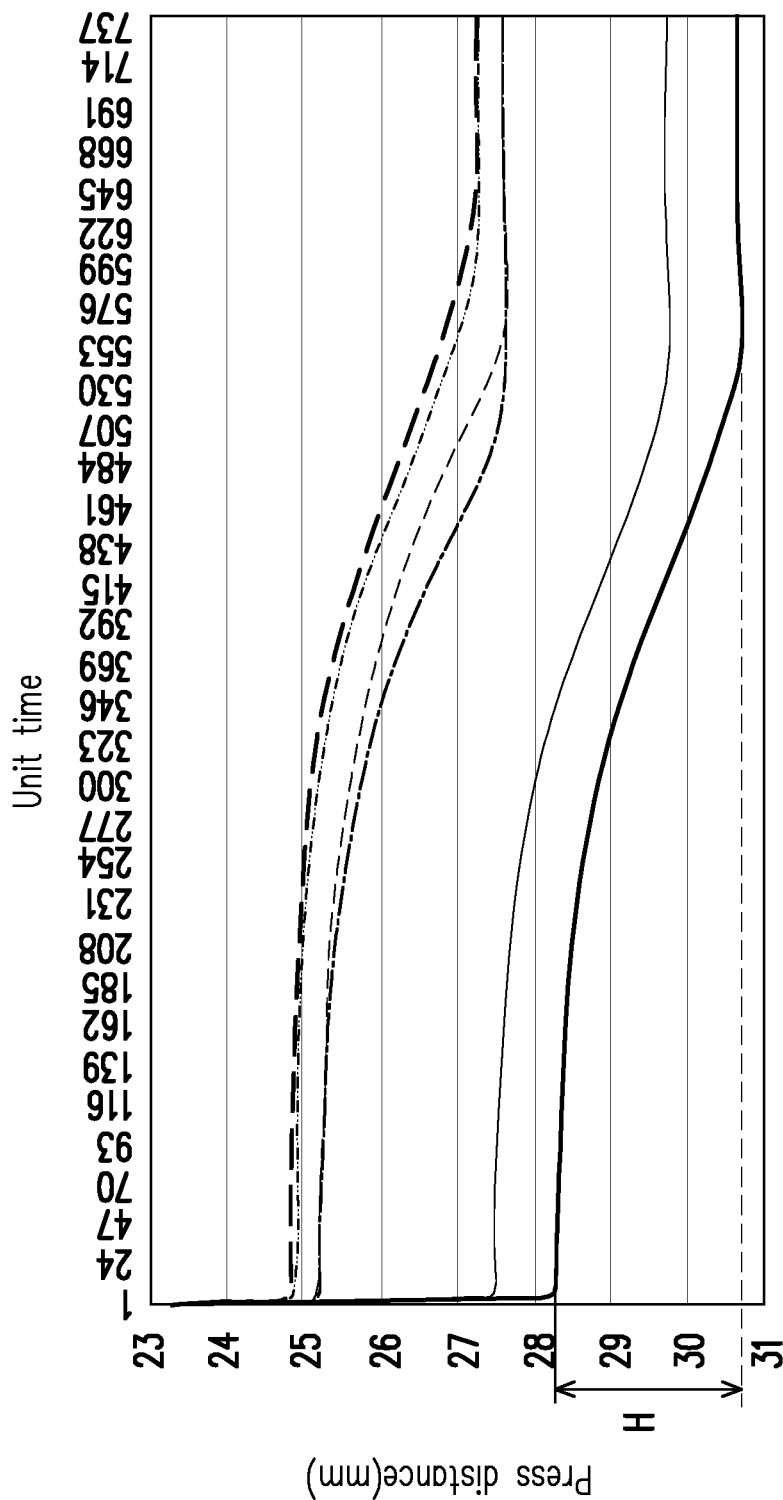
FIG. 4 is a schematic diagram illustrating a press curve according to an embodiment of the invention.

FIG. 4 is a schematic diagram illustrating a press curve according to an embodiment of the invention. FIG. 4 lists six press curves obtained from different molding cores, different machines, or different press setting parameters (temperature, pressure, velocity, torque) but corresponding to the same lens manufacturing process. Taking the lowermost press curve as an example, H represents a lens press depth. Based on the original press curve, whether a lens is abnormal is unable to be determined. Therefore, the press curves are further adjusted to make the press start point the same. In this way, whether an abnormal lens is present can be easily determined.

The slope inflection points of the pre-adjustment press curves are found. In addition, the slope inflection points of the pre-adjustment press curves are set as reference points, and press curves are obtained again by using the reference points as the press start points. The processor 210 obtains a plurality of slopes from the pre-adjustment press curves, and the comparator 215 compares each of the obtained slopes with a threshold to find the slope inflection point in each of the pre-adjustment press curves. Here, the slope is obtained from two press distances at two adjacent unit times.

The reference press curve data may be obtained according to the following: receiving a plurality of press distance parameters corresponding to a plurality of lens manufacturing processes from the distance sensor 230, so as to obtain a plurality of preliminary press curves; finding the slope inflection point in each of the preliminary press curves, setting the slope inflection point of each of the preliminary press curves as a reference point, and obtaining a plurality of adjusted preliminary press curves again by using the reference points as press start points; and by coinciding the preliminary press curves, the reference press curve is formed. Finding the slope inflection point in each of the press curves includes: obtaining a plurality of slopes from each of the preliminary press curves, and comparing each of the obtained slopes with a threshold, so as to find the slope inflection point in each of the preliminary press curves.

Figure 5:
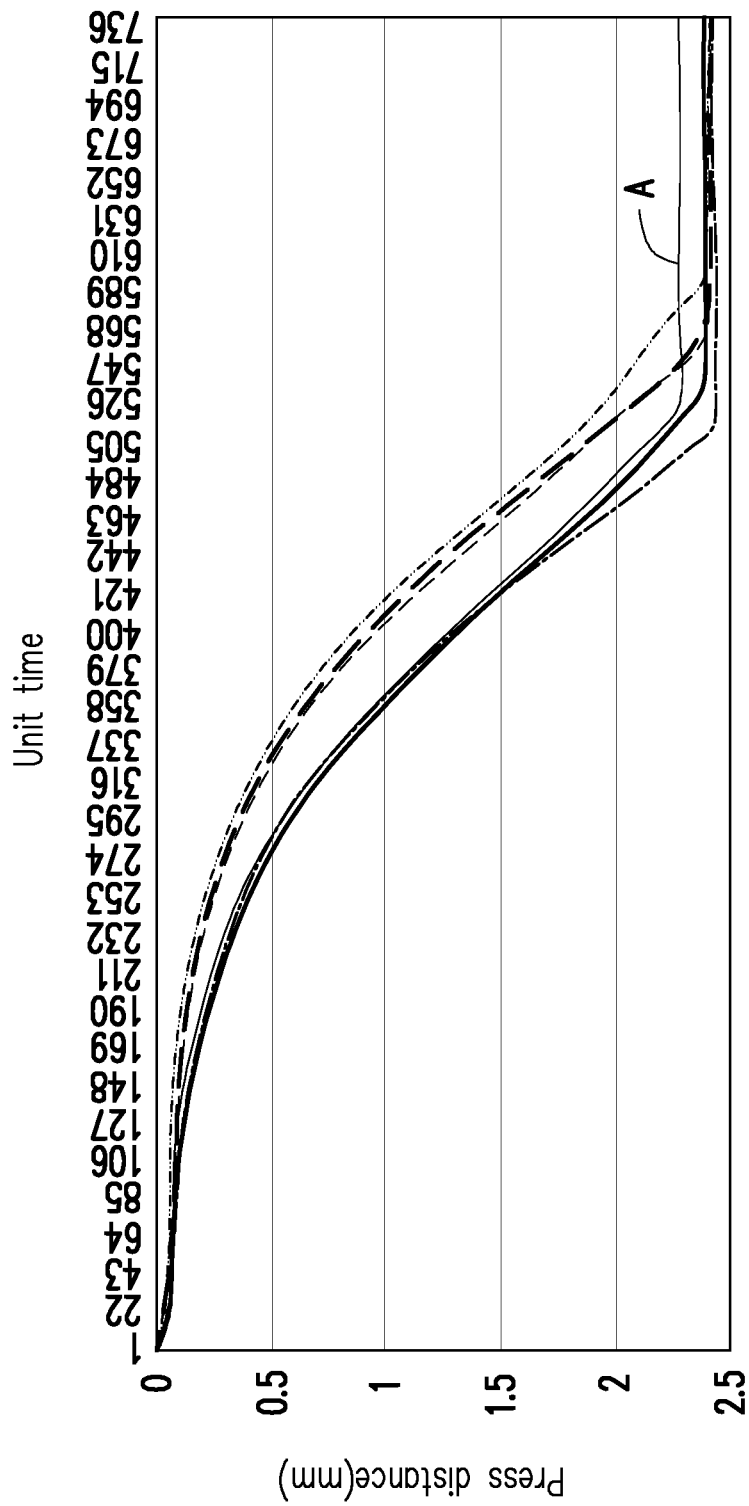
FIG. 5 is a schematic diagram illustrating an adjusted curve according to an embodiment of the invention.

FIG. 5 is a schematic diagram illustrating an adjusted curve according to an embodiment of the invention. In FIG. 5, after finding the slope inflection points in the press curves of FIG. 4, the slope inflection points are set as the reference points. Here, the reference points are set as 0, and the adjusted curves are obtained again by using the reference points as the press start points.

In the case of FIG. 5, the difference of the end line segment of an adjusted curve A from the standard exceeds the error range, indicating that the quality of the lens pressed in the lens manufacturing process corresponding to the adjusted curve A is abnormal. Accordingly, the processor 210 sends a warning signal via the alarm 225 to notify the user.

In addition, the processor 210 may also calculate a lens press depth from the adjusted curve. For example, by subtracting the press distance corresponding to the end line segment from the press distance corresponding to the press start point of the adjusted curve, the lens press depth can be obtained.

Figure 6:
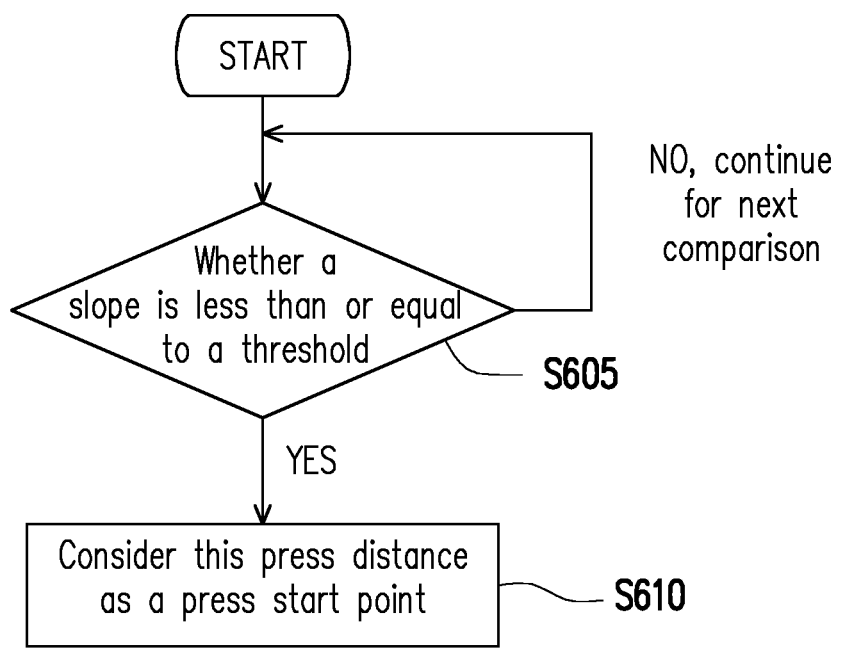
FIG. 6 is a flowchart illustrating finding a slope inflection point according to an embodiment of the invention.

In the following, another example is described to explain how the slope inflection point is found. FIG. 6 is a flowchart illustrating finding a slope inflection point according to an embodiment of the invention. Referring to FIG. 6, at Step S605, whether the slopes is less than or equal to a threshold is determined one-by-one. Here, the slope is obtained from two press distances at two adjacent unit times. When the slope is less than or equal to the threshold, the corresponding press distance is the slope inflection point, and the corresponding press distance is considered to be the press start point.

In addition, in other embodiments, the slope inflection point may also be found by using two different thresholds. In the case of FIG. 4, within a very short period of time from the outset, the press distance decreases rapidly. At this time, whether the slopes are greater than 100 (first threshold) may be firstly determined. After determining that the slopes are greater than 100, each of the slopes is compared with a second slope (e.g., 20) to find the point at which the slope abruptly decreases.

Figure 7:
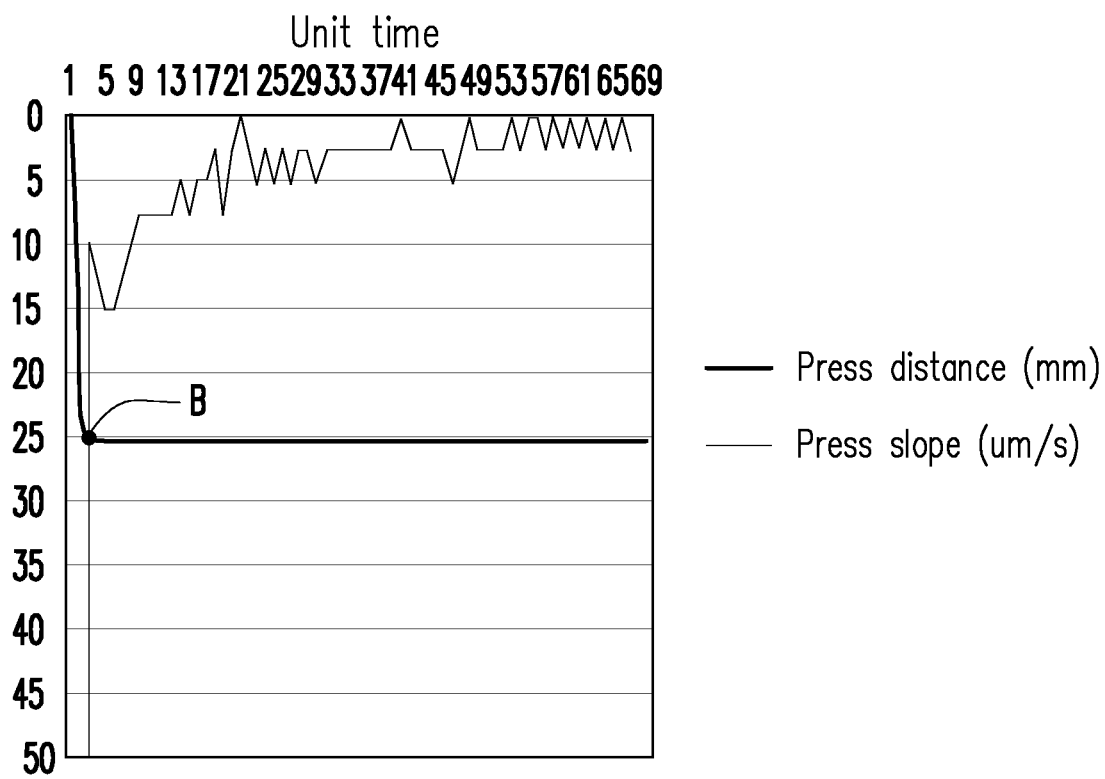
FIG. 7 is a schematic diagram illustrating looking for a slope inflection point according to an embodiment of the invention.

FIG. 7 is a schematic diagram illustrating looking for a slope inflection point according to an embodiment of the invention. As shown in FIG. 7, a point B at which the press distance curve and the press slope curve intersect is the slope inflection point.

Figure 8:
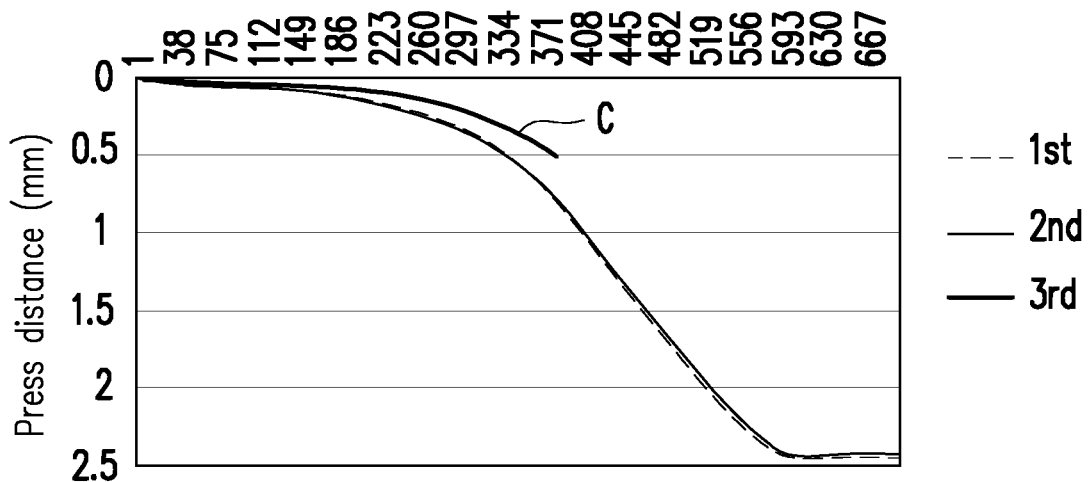
FIG. 8 is a schematic diagram illustrating a curve for in-situ monitoring of abnormal quality according to another embodiment of the invention.

In addition, FIG. 8 is a schematic diagram illustrating a curve for in-situ monitoring of abnormal quality according to another embodiment of the invention. The curves shown in FIG. 8 are the adjusted curves, and the in-situ press data is compared with the reference press curve of the same mold. As can be clearly identified in FIG. 8, an adjusted curve C is abnormal. Consequently, the abnormal pressed article can be monitored and found in-situ.

In view of the foregoing, in the embodiments of the invention, the press start point is found and serves as reference. Therefore, by analyzing the in-situ press data, defective articles can be found and eliminated and the human resource for quality control can be saved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A manufacturing method for a molded lens, comprising: locating a substrate between a first molding core and a second molding core; moving the first molding core so that the substrate is formed into a lens; sending a plurality of press distance parameters of moving the first molding core by a distance sensor, wherein the press distance parameters form a press curve; comparing the press curve and a reference press curve for a difference by using a processor and a comparator; determining whether the difference is within an error range by the processor and wherein when the difference exceeds the error range, an alarm sends a warning signal.

2. The manufacturing method for the molded lens as claimed in claim 1, wherein data of the reference press curve is stored in a storage device.

3. The manufacturing method for the molded lens as claimed in claim 1, wherein data of the reference press curve is stored in a storage device.

4. The manufacturing method for the molded lens as claimed in claim 1, wherein data of the press curve is formed according to the following:
finding a slope inflection point in a pre-adjustment press curve, setting the slope inflection point of the pre-adjustment press curve as a reference point, and obtaining the press curve by using the reference point as a press start point, wherein finding the slope inflection point in the pre-adjustment press curve comprises: obtaining a plurality of slopes from the pre-adjustment press curve, and comparing each of the obtained slopes with a threshold to find the slope inflection point in the pre-adjustment press curve, wherein each of the slopes is obtained from two press distances at two adjacent unit times.

5. The manufacturing method for the molded lens as claimed in claim 1, wherein data of the press curve is formed according to the following:
finding a slope inflection point in a pre-adjustment press curve, setting the slope inflection point of the pre-adjustment press curve as a reference point, and obtaining the press curve by using the reference point as a press start point, wherein finding the slope inflection point in the pre-adjustment press curve comprises: obtaining a plurality of slopes from the pre-adjustment press curve, and comparing each of the obtained slopes with a threshold to find the slope inflection point in the pre-adjustment press curve, wherein each of the slopes is obtained from two press distances at two adjacent unit times.

6. The manufacturing method for the molded lens as claimed in claim 1, wherein data of the reference press curve is formed according to the following:
receiving a plurality of press distance parameters corresponding to a plurality of processes of moving the first molding core from the distance sensor, so as to obtain a plurality of preliminary press curves;
finding a slope inflection point of each of the preliminary press curves, setting the slope inflection point of each of the preliminary press curves as a reference point, and obtaining a plurality of adjusted preliminary press curves again by using the reference points as press start points, wherein finding the slope inflection point in each of the preliminary press curves comprises: obtaining a plurality of slopes from each of the preliminary press curves, and comparing each of the obtained slopes with a threshold to find the slope inflection point in each of the preliminary press curves, wherein each of the slopes is obtained from two press distances at two adjacent unit times; and
forming the reference press curve by coinciding the preliminary press curves.

7. The manufacturing method for the molded lens as claimed in claim 1, wherein data of the reference press curve is formed according to the following:
receiving a plurality of press distance parameters corresponding to a plurality of processes of moving the first molding core from the distance sensor, so as to obtain a plurality of preliminary press curves;

finding a slope inflection point of each of the preliminary press curves, setting the slope inflection point of each of the preliminary press curves as a reference point, and obtaining a plurality of adjusted preliminary press curves again by using the reference points as press start points, wherein finding the slope inflection point in each of the preliminary press curves comprises: obtaining a plurality of slopes from each of the preliminary press curves, and comparing each of the obtained slopes with a threshold to find the slope inflection point in each of the preliminary press curves, wherein each of the slopes is obtained from two press distances at two adjacent unit times; and forming the reference press curve by coinciding the preliminary press curves.

8. The manufacturing method for the molded lens as claimed in claim 1, wherein a material of the substrate comprises glass or a polymer material.

9. The manufacturing method for the molded lens as claimed in claim 1, wherein a function of the press distance parameter satisfies one of the following conditions:

$$F(T,P,V)=f\{T(t),P(w,a),V(t,g)\}; \qquad (1)$$

wherein F represents a thickness of the substrate, T represents a temperature, P represents a pressure, V represents a velocity, t represents time, w represents an acting force, a represents an area of a thrust surface, and g represents a distance between two molding cores; and $$F(T,W)=f\{T(t),W(w,d)\}; \qquad (2)$$

wherein F represents the thickness of the substrate, T represents the temperature, W represents work, t represents time, w represents the acting force, and d represents a moved distance of the molding core.

10. A manufacturing apparatus for a molded lens, configured to execute the manufacturing method as claimed in claim 1, wherein the manufacturing apparatus performs a pressing process on the substrate, and the manufacturing apparatus comprises: a molding chamber, wherein the first molding core or the second molding core is movable in the molding chamber, and the substrate is located between the first molding core and the second molding core; the distance sensor, close to the molding chamber; the processor, coupled to the distance sensor; an pneumatic cylinder, coupled to the processor and capable of moving the first molding core or the second molding core; a pressure adjusting valve, coupled to the processor and the pneumatic cylinder and capable of adjusting a pressure of the pneumatic cylinder; a pressure gauge, coupled to the processor and the pneumatic cylinder and capable of displaying the pressure of the pneumatic cylinder; a heater, coupled to the processor and capable of heating the molding chamber; a power meter, coupled to the processor and the pneumatic cylinder and capable of measuring power of the heater; a temperature controller, coupled to the processor and the heater and capable of controlling a temperature of the heater; the comparator, coupled to the processor, wherein the distance sensor sends the plurality of press distance parameters of the pressing process, the press distance parameters form a press curve, and the processor and the comparator compare the press curve and the reference press curve for the difference; and a storage device, wherein data of the reference press curve is stored in the storage device.

11. The manufacturing apparatus for the molded lens as claimed in claim 10, wherein the processor determines whether the difference is within an error range.

12. The manufacturing apparatus for the molded lens as claimed in claim 11, wherein when the difference exceeds the error range, an alarm sends a warning signal.

13. The manufacturing apparatus for the molded lens as claimed in claim 12, wherein the warning signal is an audio signal or a video signal.

14. The manufacturing apparatus for the molded lens as claimed in claim 10, wherein the press curve is formed according to the following: finding a slope inflection point in a pre-adjustment press curve, setting the slope inflection point of the pre-adjustment press curve as a reference point, and obtaining the press curve by using the reference point as a press start point, wherein finding the slope inflection point in the pre-adjustment press curve comprises: obtaining a plurality of slopes from the pre-adjustment press curve, and comparing each of the obtained slopes with a threshold to find the slope inflection point in the pre-adjustment press curve, wherein each of the slopes is obtained from two press distances at two adjacent unit times.

15. The manufacturing apparatus for the molded lens as claimed in claim 12, wherein the press curve is formed according to the following: finding a slope inflection point in a pre-adjustment press curve, setting the slope inflection point of the pre-adjustment press curve as a reference point, and obtaining the press curve by using the reference point as a press start point, wherein finding the slope inflection point in the pre-adjustment press curve comprises: obtaining a plurality of slopes from the pre-adjustment press curve, and comparing each of the obtained slopes with a threshold to find the slope inflection point in the pre-adjustment press curve, wherein each of the slopes is obtained from two press distances at two adjacent unit times.

16. The manufacturing apparatus for the molded lens as claimed in claim 10, wherein data of the reference press curve is formed according to the following:

receiving a plurality of press distance parameters corresponding to a plurality of lens manufacturing processes from the distance sensor, so as to obtain a plurality of preliminary press curves;

finding a slope inflection point of each of the preliminary press curves, setting the slope inflection point of each of the preliminary press curves as a reference point, and obtaining a plurality of adjusted preliminary press curves again by using the reference points as press start points, wherein finding the slope inflection point in each of the preliminary press curves comprises: obtaining a plurality of slopes from each of the preliminary press curves, and comparing each of the obtained slopes with a threshold to find the slope inflection point in each of the preliminary press curves, wherein each of the slopes is obtained from two press distances at two adjacent unit times; and forming the reference press curve by coinciding the preliminary press curves.

17. The manufacturing apparatus for the molded lens as claimed in claim 12 wherein data of the reference press curve is formed according to the following:

receiving a plurality of press distance parameters corresponding to a plurality of lens manufacturing processes from the distance sensor, so as to obtain a plurality of preliminary press curves;

finding a slope inflection point of each of the preliminary press curves, setting the slope inflection point of each of the preliminary press curves as a reference point, and obtaining a plurality of adjusted preliminary press curves again by using the reference points as press start points, wherein finding the slope inflection point in each of the preliminary press curves comprises: obtaining a plurality of slopes from each of the preliminary press curves, and comparing each of the obtained slopes with a threshold to find the slope inflection point in each of the preliminary press curves, wherein each of the slopes is obtained from two press distances at two adjacent unit times; and forming the reference press curve by coinciding the preliminary press curves.

18. The manufacturing apparatus for the molded lens as claimed in claim 10, wherein a material of the substrate comprises glass or a polymer material.

19. The manufacturing apparatus for the molded lens as claimed in claim 10, wherein a function of the press distance parameter satisfies one of the following conditions:

$$F(T,P,V)=f\{T(t),P(w,a),V(t,g)\}; \quad (1)$$

wherein F represents a thickness of the substrate, T represents a temperature, P represents a pressure, V represents a velocity, t represents time, w represents an acting force, a represents an area of a thrust surface, and g represents a distance between two molding cores; and $$F(T,W)=f\{T(t),W(w,d)\}; \quad (2)$$

wherein F represents the thickness of the substrate, T represents the temperature, W represents work, t represents time, w represents the acting force, and d represents a moved distance of the molding core.

\* \* \* \* \*